Patented Sept. 19, 1939

2,173,425

UNITED STATES PATENT OFFICE 2,173,425

MONOFORMATE OF ANDROSTENEDIOL AND PROCESS FOR PRODUCING SAME

Leopold Ruzicka, Zurich, and Albert Wettstein and Hans Kaegi, Basel, Switzerland, assignors to the firm Society of Chemical Industry in Basle, Basel, Switzerland No Drawing. Application June 15, 1936, Serial No. 85,436. In Switzerland June 18, 1935

2 Claims. (Cl. 260—397)

In application Serial No. 46,967, filed October 26, 1935, there is described a process for making saturated alcohols of the type androstanediol by reduction of the fundamental oxy-ketones or their derivatives in acid, neutral or alkaline solution.

The present invention relates to the manufacture of unsaturated alcohols or derivatives thereof by reducing compounds of the type of dehydroandrosterone or its derivatives, substituted at the hydroxyl group, in neutral or an alkaline solution. As reducing agents, alkali metals in presence of alcohol, aluminium-alcoholate (aluminium-isopropylate or aluminium-benzylate), or organo-metallic compounds like magnesium-alkyl-halides or catalytically excited hydrogen, come into question. In the last case there is advantageously used a non-noble or noble metal catalyst, for instance nickel, cobalt or platinum-oxide, and, as a solvent, in particular an aliphatic alcohol of low molecular weight.

It is surprising that in the process of the invention the carbon double bond is not attacked but merely the keto-group present is reduced to a carbinol.

For example, starting from $\Delta^{5,6}$-trans-dehydroandrosterone [$\Delta^{5,6}$-3-oxy-aetio-cholenone-(17)] of Formula I were obtained $\Delta^{5,6}$-trans-androstene-diols-(3,17) of Formula II:

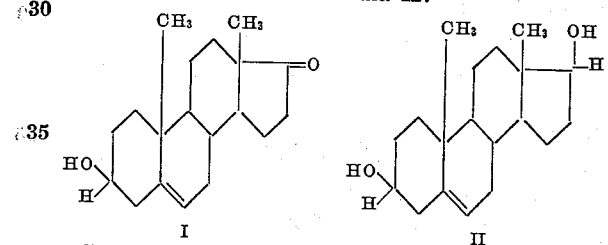

I                II

Instead of the free oxy-ketones one may start from their derivatives, for example their esters or ethers.

The products of the invention are useful as therapeutic agents or as intermediate products for the manufacture of active therapeutic compounds. They have proved active in the testing of both male and female sexual activity.

The following examples illustrate the invention, the parts being by weight:

Example 1

Into a boiling solution of 1 part of $\Delta^{5,6}$-trans-dehydroandrosterone in 15 parts of methanol there are introduced in several portions 1.2 parts of sodium. When the reduction is finished, the product is precipitated by adding water, filtered, washed with water and dried over phosphorus pentoxide. It is a mixture of both possible stereo-isomeric diols which can be separated by fractional crystallization from ethyl-acetate and dilute alcohol. The diols obtained may be esterified by known methods, for instance by means of acetic anhydride.

Example 2

Into a gently boiling solution of 14 parts of trans-dehydroandrosterone in 40 parts of n-propyl-alcohol there are introduced, whilst stirring, 23 parts of sodium. When the reaction is complete the mixture is cooled, cautiously neutralized with hydrochloric acid, evaporated in a vacuum and mixed with water to precipitate the diol which has been produced. By washing the matter on the filter with water and crystallizing it from methanol or ethyl-acetate, there is obtained an individual $\Delta^{5,6}$-trans-androstene-3,17-diol of melting point 182–183° C.

Instead of n-propyl-alcohol, another alcohol, for instance ethyl-alcohol or isopropyl-alcohol, may be used.

Example 3

2 parts of $\Delta^{5,6}$-trans-dehydroandrosterone are dissolved in 150 parts of alcohol, 7.5 parts of a nickel catalyst containing a carrier are added, and the whole is shaken with hydrogen under an excess pressure of 2½ meters water column. After a few hours the hydrogen calculated for 1 molecular proportion has been absorbed, the catalyst is filtered and the alcohol in greater part evaporated. From the residue crystallizes pure $\Delta^{5,6}$-trans-androstene-3,17-diol of melting point 183.5–184.5° C. Further quantities of the diol can be recovered from the mother liquor.

Instead of nickel as catalyst there may also be used other non-noble metals, for instance cobalt, copper or mixtures of these metals.

Example 4

1.38 parts of $\Delta^{5,6}$-trans-dehydroandrosterone-acetate are dissolved in 100 parts of alcohol, and under the conditions named in Example 3 the solution is hydrogenated. When the hydrogen absorbed corresponds with one molecular proportion, the hydrogenation is finished. After evaporating the alcohol, there remains $\Delta^{5,6}$-androstene-3,17-diol-3-acetate. By recrystallization from hexane it is obtained in the form of lustrous needles of melting point 147–148° C.

Instead of trans-dehydroandrosterone acetate there may also be used as parent material esters with other aliphatic carboxylic acids, as well as aromatic or alicyclic carboxylic acids, such as for example formic acid, benzoic acid or hexahydrobenzoic acid. In this manner there are obtained the corresponding mono-esters of androstenediol. Trans-dehydro-androstene-ethers, such as for example the methyl or ethyl ether, can also be converted into mono-ethers of the androstenediol.

*Example 5*

100 parts of platinum-oxide are reduced by shaking them with hydrogen in absolute alcohol. After addition of 174 parts of trans-dehydroandrosterone, the mass is further shaken until 1 molecular proportion of hydrogen has been absorbed. Duly worked up, the unsaturated diol of melting point 183.5–184.5° C. is obtained.

Instead of platinum-oxide there may also be used for instance platinum as catalyst.

*Example 6*

576 milligrams of $\Delta^{5,6}$-trans-dehydro-androsterone of melting point 148° C. are dissolved in 50 cc. of absolute ether, and to the solution is added in drops a Grignard solution made from 0.39 gram of magnesium and 2.24 grams of ethyl-iodide. The whole is heated for 8 hours on a water bath, allowed to stand at room temperature over night, and then decomposed by means of ice and hydrochloric acid. The ethereal solution is washed with bisulphite, sodium carbonate and water, and then dried and evaporated. The residue is dissolved in methyl-alcohol and as usual is boiled for a short time with an alcoholic solution of semicarbazide-acetate. After standing for 24 hours the whole is filtered. If the solution is sufficiently concentrated, the precipitate consists of a mixture of 17-ethyl-trans-androstene-diol-(3,17) of melting point 199–200° C. and the semicarbazone of the trans-dehydro-androsterone; by treating the precipitate with ether the semicarbazone, in consequence of its sparing solubility, may be removed. In the case of a dilute solution, only the semicarbazone is precipitated. In that case the alcoholic solution is concentrated somewhat, and the 17-ethyl-trans-androstene-diol-(3,17) is frozen out. The mother liquor contains in each case besides 17-ethyl-trans-androstene-diol-(3,17), 3-trans-androstene-diol formed by reduction. For isolating it the mother liquor is poured into water and the liquor is extracted with ether; the ethereal solution is washed, dried and evaporated. The product is crystallized from a mixture of ethyl-acetate and hexane or is sublimed at 140° C. under a pressure of 0.01 millimeter. There is thus obtained a mixture of isomeric 17-cis and -trans-3-trans-androstene-diols, melting at 173–173.5° C.

*Example 7*

576 milligrams of $\Delta^{5,6}$-trans-dehydro-androsterone of melting point 148° C. are dissolved in 50 cc. of absolute ether, and into the solution is dropped a Grignard solution from 0.39 gram of magnesium and 2.6 grams of n-propyl-iodide. The mixture is heated for 8 hours on a water bath, allowed to stand over night at room temperature and then decomposed in ice and dilute hydrochloric acid. The ethereal solution is washed with bisulphite, sodium carbonate and water, dried and evaporated. The residue is dissolved in methyl-alcohol and boiled for a short time with an alcoholic solution of semi-carbazide-acetate. After standing for 24 hours the separated semicarbazone of the trans-dehydroandrosterone is filtered, and the filtrate is poured into water. This liquor is extracted with ether; the ethereal solution is washed, dried and evaporated. The residue is recrystallized from a mixture of ethyl-acetate and hexane and yields the mixture of isomeric 17-cis and -trans-3-trans-androstene-diols described in Example 6.

What we claim is:

1. A process for the manufacture of the mono-formate of androstene-diol of the formula

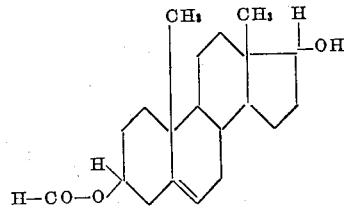

consisting in reducing the keto-group of the formate of dehydroandrosterone of the formula

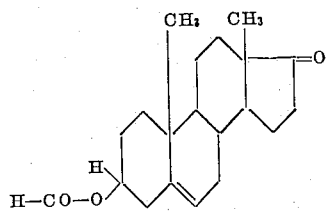

to a carbinol group with hydrogen in presence of a non-noble hydrogenating metal catalyst in a neutral medium.

2. The mono-formate of androstene-diol having the formula

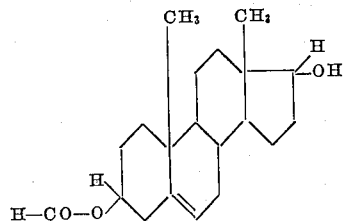

LEOPOLD RUZICKA.
ALBERT WETTSTEIN.
HANS KAEGI.